R. W. MARTIN.
SANITARY PRESSURE FILTER.
APPLICATION FILED DEC. 23, 1910.
1,015,051.
Patented Jan. 16, 1912.
2 SHEETS—SHEET 2.
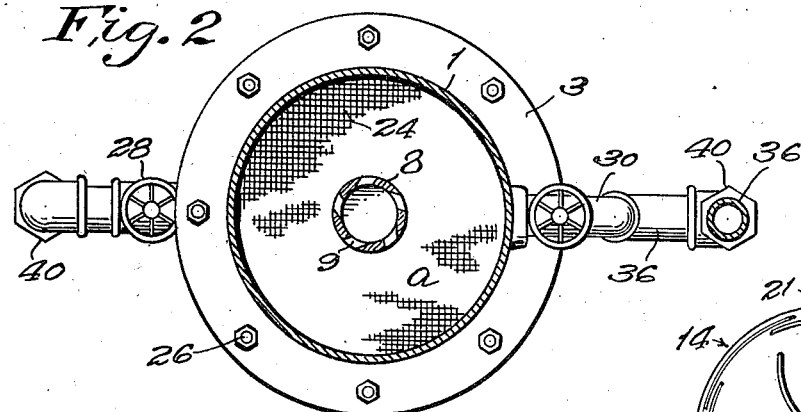
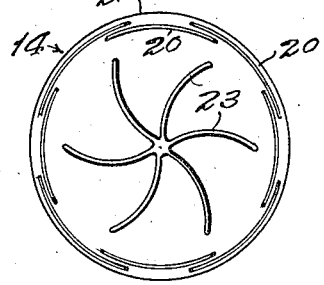
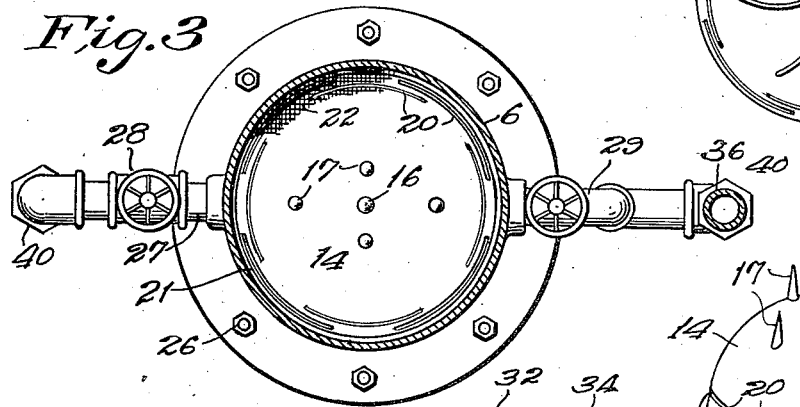
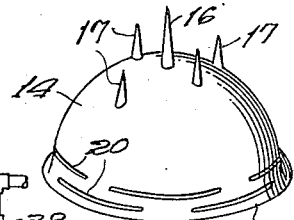
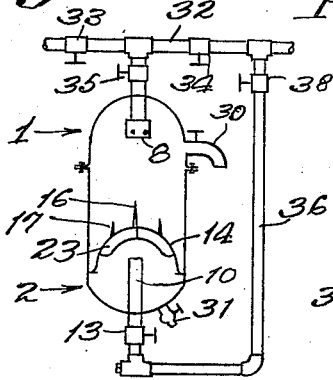
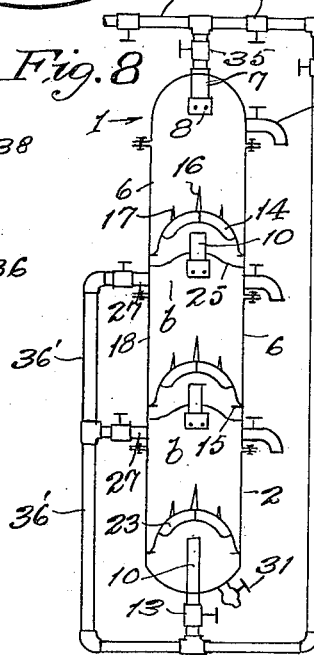
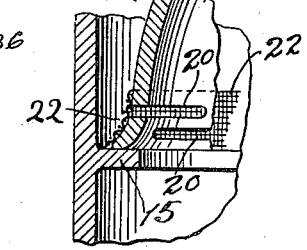
Witnesses
C. C. Holly
L. Belle Rice
Inventor
Richard W. Martin
by James R. Townsend
his Atty.

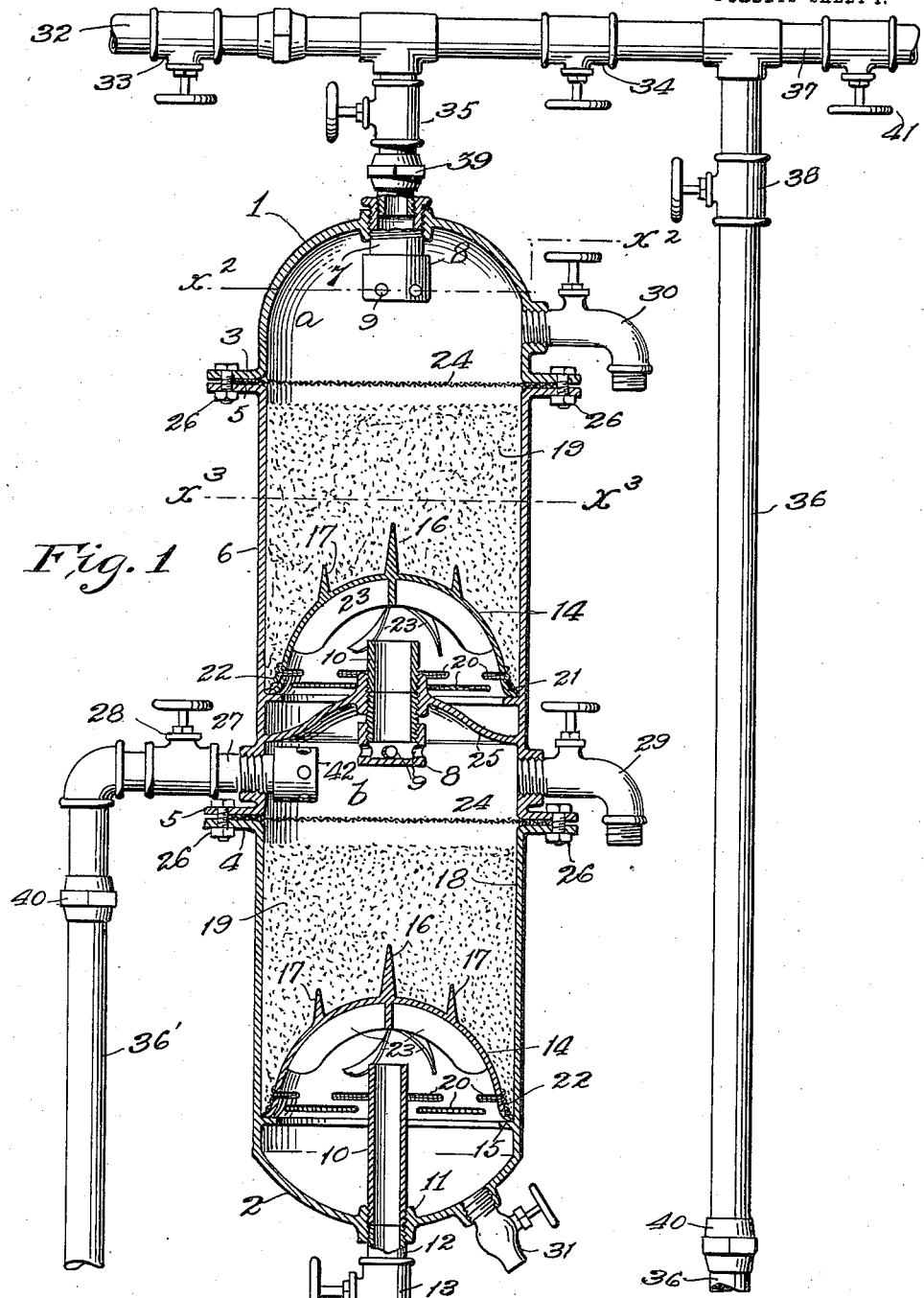

UNITED STATES PATENT OFFICE.

RICHARD W. MARTIN, OF LOS ANGELES, CALIFORNIA.

SANITARY PRESSURE-FILTER.

1,015,051.          Specification of Letters Patent.          Patented Jan. 16, 1912.

Application filed December 23, 1910. Serial No. 599,009.

*To all whom it may concern:*

Be it known that I, RICHARD W. MARTIN, a citizen of the United States, residing at Los Angeles, in the county of Los Angeles and State of California, have invented a new and useful Sanitary Pressure-Filter, of which the following is a specification.

An object of this invention is to provide for household and other uses a compact filter having comparatively large filtering surface and adapted to be attached between the main and the distributing points, and which will filter with maximum efficiency the water delivered from the main to the distributing points and in which the current may be readily and effectively changed for the purpose of washing out accumulations from time to time as the same occur, and I purpose to construct an apparatus of this kind which is capable of indefinite extension to increase the filtering effect where required to take care of water of great turbidity or under high pressure.

Other objects are cheapness, simplicity, ease of assembling and taking apart and ease of recharging with filtering materials.

The invention is capable of use in all instances with all liquids in which filtration is desired.

The accompanying drawings illustrate the invention.

Figure 1 is a vertical mid-section of filtering apparatus constructed in accordance with this invention and employing two filter bodies. Fig. 2 is a plan in section on line $x^2$, Fig. 1. Fig. 3 is a plan section on line $x^3$, Fig. 1, omitting the filtering material. Fig. 4 is a view looking up into the filter support shown in Fig. 3. Fig. 5 is a perspective view of the exterior of one of the rotary filter supports. Fig. 6 is an enlarged fragmental detail of one of the joints between the charge support and its seat. Fig. 7 is a diagrammatic view of the apparatus as constructed with only one filter body. Fig. 8 is a diagrammatic view of the apparatus embodying this invention in which three filter bodies are used.

The container comprises intake and outlet heads 1, 2, which are practically hemispherical at one end and terminate at the other end in flanged rims 3, 4, adapted to be united together or onto similar flanged rims 5 of one or more intermediate chambers 6. The supply nipple 7 opens through the axis of the intake head 1 and is provided inside said head with a nozzle cap 8 having in its periphery tangentially arranged outlets 9 directed toward the walls of the head so that any liquid flowing from the nozzle will be given a rotary motion inside the head, thus to prevent formation of any direct penetrating stream from any outlet of the nozzle to the filtering material contained in the shell of the filter. The nozzle cap is cylindrical and the perforations or ports 9 are close to the closed bottom of the cylinder so that the liquid is discharged close to the center and there are no obstructions in the inlet dome formed by the head 1 and the liquid is thus caused to rotate about a center below the cap for the purpose above stated. The outlet head 2 is preferably hemispherical at its outlet end and is there provided at its axis with the outlet pipe which is preferably composed of a nipple 10 extending for a distance inside the chamber of the head and screwed into the inner end of the internally screw threaded collar 11 of the head which extends inwardly and outwardly, and into the outer end of which is screwed the outer nipple 12 which is connected with the outlet valve 13.

Between the intake and inner outlet nipple 10 a dome-like filter base or support 14 is mounted on a seat 15, which may be a flange projecting inwardly from the head 2. The filter charge support is preferably provided externally with prongs 16, 17, extending into the filter chamber 18 which is preferably cylindrical and in which the filter charge 19 is contained. Passage ways 20 are provided at the base, near the periphery and above the flaring flange 21 of the filter charge support and the seat 15 therefor. Over the passage ways 20 a filter screen 22 sufficient to prevent the material of the filter charge from passing through the ways 20 is applied and the filter charge 19 rests upon the same and upon the charge support 14. Said screen is soldered or otherwise fixed to the support.

The material of the filter charge 19 may be of any approved character, and so far as I am at present aware it is most desirable that such material be of at least two different substances as crushed granite and crushed charcoal, either animal or vegetable, as may be most desirable or appropriate for the purpose in hand. The volume of the filter charge is less than the cubical contents of the filter chamber so that the charge can be loosened as hereinafter described.

The object in having the two kinds of material is to produce a scouring action between the particles thereof when the apparatus is manipulated to clean the filter material as hereinafter set forth. The charge in any filtering chamber will nearly, but not quite, fill the same so that when the current of liquid is reversed in the filter the charge support may be forced up and the material that constitutes the charge will be loosened up and agitated with a scouring action.

Inside the dome-shaped filter charge supports 14 propeller blades 23 are arranged radiating downwardly from the axis of the support which is directly above the nipple 10 so that when liquid is admitted through the nipple 10 it will lift the charge support and will produce a rotary motion thereof, thus causing the outer spikes 17 to stir and loosen the filter charge. The upper end of each filter chamber is covered by a fine wire filter screen 24 so that although the material of the filter charge is loose in its chamber, it cannot escape therefrom.

The main intake and outlet heads 1 and 2 may be connected directly together as shown in Fig. 7; or one or more intermediate filter chambers 6 may be interposed as shown in Figs. 1 and 8. Where an intermediate filter chamber is interposed an intermediate head 25 corresponding in function to the head 1 during the filtering operation and to the head 2 during the washing operation is provided; said head 25 being dome-shaped at its upper end corresponding to the dome-like character of the intake head 1, thus forming a free water chamber beneath the head and above the filter-charge retaining screen 24. The free water chambers in Fig. 1 are respectively marked $a$, $b$. The intermediate filter chamber is provided at its ends with flanges 5 for connection by means of bolts 26 with the main intake and outlet heads. Each of the heads 1, 2, and 25 is provided with an internally threaded collar such as the collar 11, and in the upper ends of the collars of each of the heads 2 and 25 there are screwed nipples 10, which are of any appropriate length and extend inside the filter charge supports 14 and terminate close to the propeller blades 23 when said charge supports are normally seated. By this construction the reverse flow of liquid through the filter may act upon any or all of the filter charge supports to raise and rotate the same.

The chamber $b$ below the head 25 is provided with an inlet 27 controlled by a valve 28 and with a wash-out cock 29 so that the chamber may be directly washed out. The intake head is also provided with a wash-out cock 30 and the outlet head 2 is provided with a wash-out cock 31. The main 32 may be provided with a main valve 33 and by-pass valve 34 between which is the filter valve 35 that controls the inlet to the filter head. The filter pipe 36 connects between the filter outlet 12 and the distributing pipe 37 through which filtered water may be drawn from the filter when the by-pass valve 34 is closed and the valves 33, 35 and 13 are open. When the by-pass valve 34 is open and either or both the valves 35, 38 are closed, unfiltered water will be delivered to the distributing pipe. The filter can be bodily removed by closing the valves 35 and 38 and disconnecting the unions 39 and 40 in the filter and wash pipes 36, 36'. The distributing pipe 37 is provided with a valve 41 which is to be closed to insure full pressure in the system for washing out the filter.

In practical use the valves 33, 35, 13 and 38 will usually be open and the valves 34 and 28 will be closed. Then whenever a faucet, not shown, on the distributing pipe 37 is opened the liquid will be drawn to the distributing pipe through the filter and when the faucet is closed the filtering action ceases. While the liquid is being drawn through the filter it issues in tangential streams from the nozzle 8 in such a manner as to cause a circular movement of the liquid in the head above the filter charge, and consequently the liquid does not flow in direct currents through the filter charge but penetrates the entire mass. As it proceeds to the lower end of the charge it is deflected outward and escapes through the widely extended passage ways 20 near the periphery of the base of the charge support.

In systems where the pressure is not excessive, or the liquid to be filtered is not excessively impure, a single charge filter may be employed; and where the pressure is excessive or the liquid to be filtered is very turbid, additional filter chambers may be employed as desired; thus enabling the filtration of a large quantity of liquid with comparatively small diameter of filtering chamber. To wash out surface accumulations which may occur in any of the heads, the washout cocks 29 and 30 may be opened one at a time, whereupon the liquid from the nozzle 8 will scour out the contents of the chamber and discharge the same through the opened washout cock. When it is desired to scour the filter charges, referring to Fig. 1, this may be done by closing the valves 35 and 41 and opening the valves 34, 38, 13 and cock 29. This causes the liquid to flow upward against the propeller blades 23, thereby rotating the filter support 14 and forcing it upward, thus loosening and agitating the filter material 19 and carrying the impurities back up into the head 25 and out at the cock 29. When this washing out has been satisfactorily effected the valve 13 and cock 29 may be closed and the valves 28 and cock 30 opened, and thereupon the action just described with regard to the charge in chamber 18 will be effected in the chamber 6. If it is desired to wash out the head 25 the valves 30 and 13 may be closed and the valves 28 and 29 opened, thus causing the liquid to flow directly into the chamber $b$ under head 25 and out through the washout cock 29. Washout cocks may be provided wherever required for the purpose of discharging the impurities. The lateral inlet 27, to any intermediate chamber $b$, is also preferably provided with a nozzle 42 corresponding to the nozzle 8 to produce a rotary motion in the intermediate chamber $b$, thus to stir up and dislodge any solid material contained in said chamber when the washing out is effected. The nipple and nozzle cap form a depending straight cylindrical discharge nozzle inside the inlet and wash-out dome, so that in the operation of cleansing the filter the water may be turned directly into the chamber $a$ to give it a final wash out so that in order to thoroughly cleanse the filter the liquid will first be passed upward through the filter material to the chamber $a$ and the wash-out cock and then directly through the nozzle into the upper chamber $a$ or $b$ as the case may be and through the washout cock.

I claim:

1. A filter comprising a filter chamber, an intake head provided with an intake chamber and a wash-out cock, a screen between the intake chamber and filter chamber and a nipple extending down from the center of the intake head and provided with a cylindrical nozzle cap centrally arranged in the filter head above said screen and provided in its periphery with tangential outlets to deliver liquid into the chamber at the center thereof with a rotary motion.

2. In a filter, a filter chamber, a loose concavo-convex support for filtering material in said filter chamber, said support being provided in its concave face with propeller blades, and means to direct a stream of liquid against said propeller blades to lift and rotate the support.

3. A filter comprising a filtering chamber, a loose hollow inverted support for filtering material in said filtering chamber; said support being provided on its upper face with agitating means and on its under face with propeller blades, and means to direct liquid against said support and propeller blades to lift and rotate the support.

4. A filter comprising a filtering chamber, a loose support for filtering material in said filtering chamber, agitating means on the top of said support, propeller blades on the underside of said support, and means for directing liquid against said propeller blades to lift and rotate the support.

5. In a filter, a hemispherical dome to support the filtering material, propeller blades fixed to the underside of the dome and means to direct liquid against said blades.

In testimony whereof, I have hereunto set my hand at Los Angeles, California, this 12th day of December 1910.

R. W. MARTIN.

In presence of—
 JAMES R. TOWNSEND,
 L. BELLE RICE.

---

Copies of this patent may be obtained for five cents each, by addressing the "Commissioner of Patents Washington, D. C."